US009572009B2

(12) United States Patent
Zhu

(10) Patent No.: US 9,572,009 B2
(45) Date of Patent: Feb. 14, 2017

(54) EXTENDED AREA EVENT FOR NETWORK BASED PROXIMITY DISCOVERY

(71) Applicant: Telecommunication Systems, Inc., Annapolis, MD (US)

(72) Inventor: Yinjun Zhu, Sammamish, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 15/214,887

(22) Filed: Jul. 20, 2016

(65) Prior Publication Data
US 2016/0330605 A1 Nov. 10, 2016

Related U.S. Application Data

(63) Continuation of application No. 14/472,857, filed on Aug. 29, 2014, now Pat. No. 9,408,034.

(60) Provisional application No. 61/875,291, filed on Sep. 9, 2013.

(51) Int. Cl.
| H04B 7/00 | (2006.01) |
| H04W 8/00 | (2009.01) |
| H04W 4/00 | (2009.01) |
| H04W 76/02 | (2009.01) |
| H04W 4/02 | (2009.01) |

(52) U.S. Cl.
CPC ............ *H04W 8/005* (2013.01); *H04W 4/005* (2013.01); *H04W 4/008* (2013.01); *H04W 4/023* (2013.01); *H04W 76/023* (2013.01)

(58) Field of Classification Search
CPC ...... H04W 4/023; H04W 8/005; H04W 4/005; H04W 4/008; H04W 76/023
USPC ......................................................... 455/41.2
See application file for complete search history.

(56) References Cited

U.S. PATENT DOCUMENTS

| 6,813,501 | B2* | 11/2004 | Kinnunen | H04W 4/02 342/457 |
| 8,525,681 | B2* | 9/2013 | Gehrke | G08B 21/0269 340/539.13 |
| 2006/0046709 | A1* | 3/2006 | Krumm | H04N 21/4126 455/422.1 |
| 2009/0234950 | A1* | 9/2009 | Wikman | G06F 9/5055 709/225 |
| 2014/0056220 | A1* | 2/2014 | Poitau | H04W 40/246 370/328 |

* cited by examiner

*Primary Examiner* — Nader Bolourchi
(74) *Attorney, Agent, or Firm* — Tarolli, Sundheim, Covell & Tummino LLP

(57) ABSTRACT

A network-centric device discovery solution that leverages area event location services. A proximity server (PS) performing device discovery for a discoverer mobile initiates an area event, via a location server, for each device subscribed to the same proximity service group as the discoverer mobile and camped on the same zone as the discoverer mobile. The area event notifies the PS each time such device moves into an area of an E-CGI and/or WiFI access point where the discoverer mobile attaches. If the PS receives an area event notification for the device camped on the same zone as the discoverer mobile, the PS requests location information for the device and uses returned location information to determine if the device is within a predefined proximity of the discoverer mobile. If the device is within a predefined proximity of the discoverer mobile, the PS sends a proximity alert message to the discoverer mobile.

20 Claims, 16 Drawing Sheets

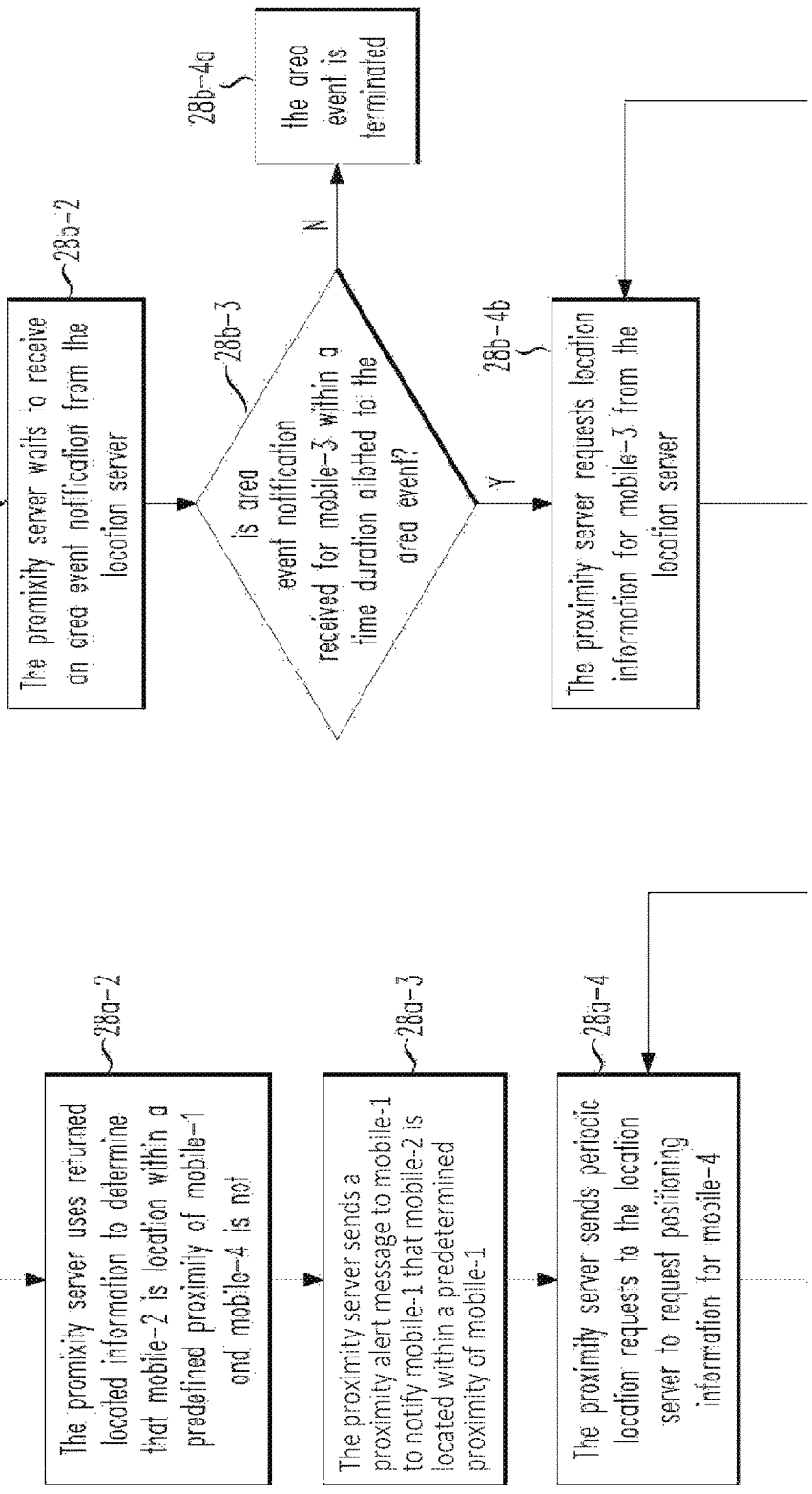

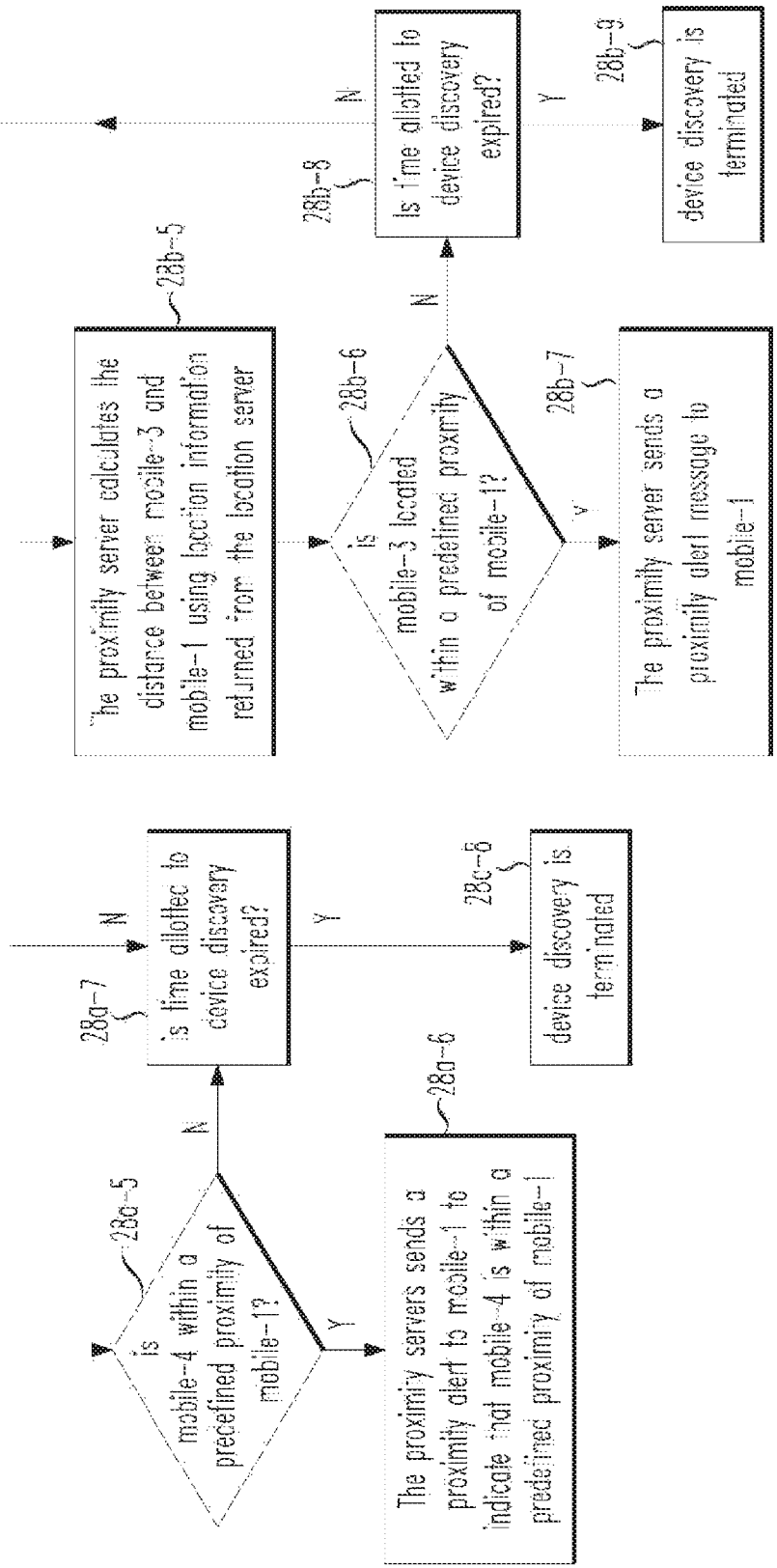

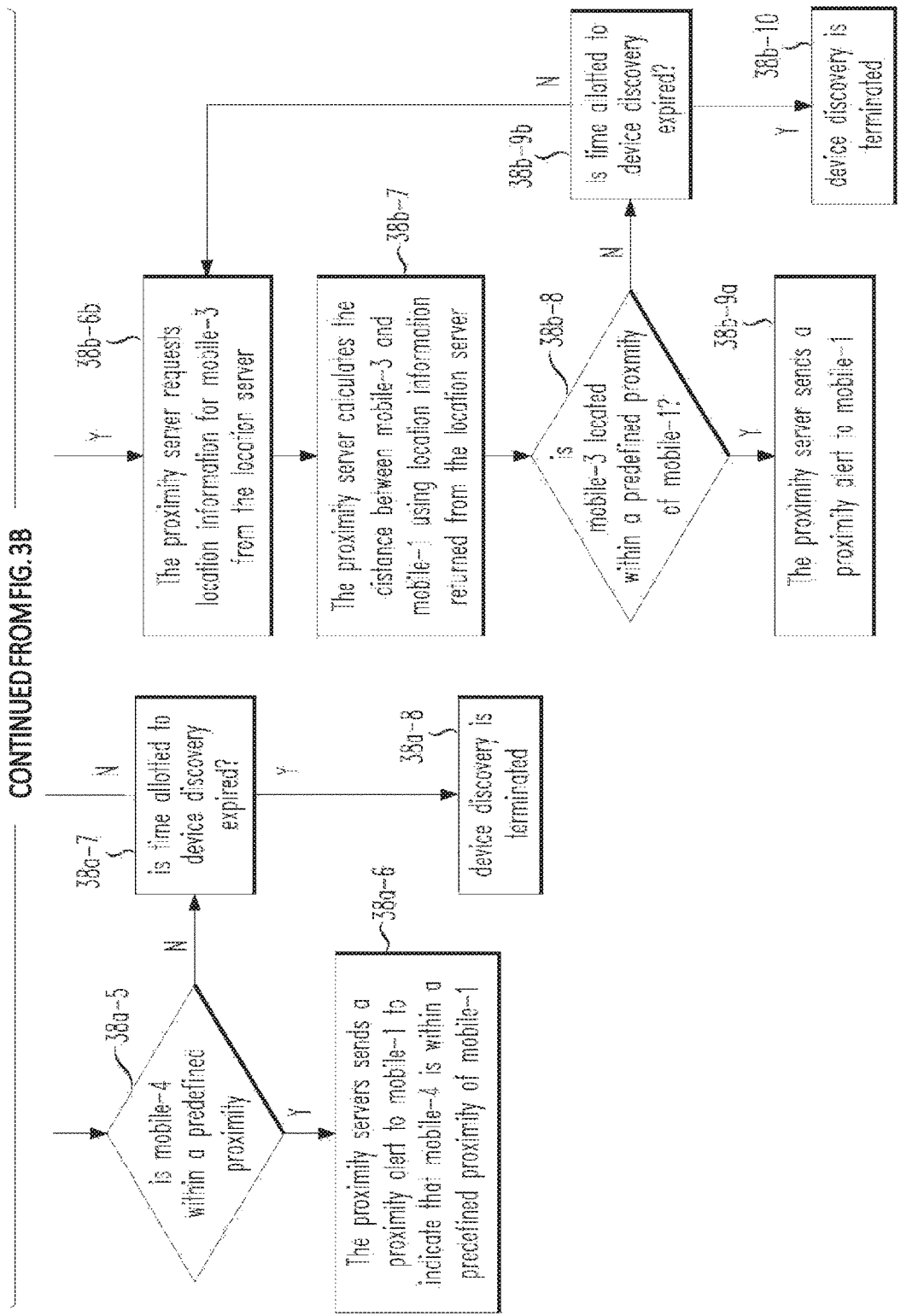

LEGEND

EXTENDED AREA EVENT FOR NETWORK BASED PROXIMITY DISCOVERY

The present application is a continuation of U.S. application Ser. No. 14/472,857, filed on Aug. 29, 2014; which in turn claims priority from U.S. Provisional Patent Appl. No. 61/875,291, filed on Sep. 9, 2013, the entirety of which are expressly incorporated herein by reference.

BACKGROUND OF THE INVENTION

1. Field of the Invention

This invention relates generally to wireless Internet Service Providers, Public Safety Service Providers and information content delivery services/providers for wireless networks and/or Public Safety Service networks. More particularly, it relates to location services for the wireless industry.

2. Background of Related Art

A proximity based service is a conventional service that utilizes location technology to allow subscriber devices to discover other subscriber devices located within a predefined proximity range. Subscriber devices that discover one another can then engage in direct peer-to-peer (p2p) communications, with or without use of a radio network infrastructure, e.g., a base station. WiFi may also be used as a medium for proximity based services.

A conventional proximity based service comprises two components: device discovery and direct communications. The device discovery component of a proximity based service enables subscriber devices to discover other subscriber devices that are located nearby (i.e. located within a predefined proximity zone), when subscriber devices are being serviced by a network that supports proximity based services.

Moreover, the direct communications component of a proximity based service permits any two or more proximity based services enabled devices, located within a predefined proximity of one another, to engage in direct peer-to-peer (p2p) communications.

FIGS. 8A-8B depicts an illustrative example of direct peer-to-peer (p2p) communications for proximity based services.

In particular, as portrayed in FIG. 7, when two or more proximity based services enabled devices 800, 810, 820 discover one another within a predefined proximity zone 830, the devices 800, 810, 820 may set up a direct peer-to-peer (p2p) communications session 840, with or without use of a radio network infrastructure (e.g. a base station) 850.

FIG. 7 depicts a conventional network-centric device discovery method.

In particular, as portrayed in step 71 of FIG. 8A, a mobile-1, a mobile-2, a mobile-3, and a mobile-4 all subscribe to the same proximity service group.

As shown in step 73, the mobile-1, mobile-2, mobile-3, and mobile-4 subsequently move into the coverage areas of a base station A and a base station B, and all are registered by mobile identifier and cell-ID (e.g. CGI or ECGI) at a proximity server.

In step 75, mobile-1 sends a device discovery request to the proximity server to request location information for mobile devices (e.g. mobile-2, mobile-3, and mobile-4) subscribed to the same proximity service group as mobile-1.

In step 77, the proximity server receives the device discovery request and initiates a location request for mobile-2, mobile-3, and mobile-4, each of which are subscribed to the same proximity service group as mobile-1.

In step 79, in the given example, the proximity server determines that mobile-2 and mobile 4 are located within a predefined proximity of mobile-1.

In step 81, upon such discovery, the proximity server sends a proximity alert message to mobile-1 to notify mobile-1 that mobile-2 and mobile-4 are both located within a predefined proximity of mobile-1.

As depicted in step 83 of FIG. 8B, the proximity server periodically sends location requests to the location server to request positioning information for mobile-3, within an expiration time duration allotted to the device discovery request as shown in step 89.

As shown in steps 85 and 87, if during the time duration allotted to the device discovery request, mobile-3 is within a predefined proximity of mobile-1, the proximity server sends a proximity alert message to mobile-1 to indicate that mobile-3 is now located within a predefined proximity of mobile-1.

If the time duration allotted to the device discovery request expires, device discovery is terminated, as portrayed in step 91 of FIG. 8B.

In the network-centric device discovery solution portrayed in FIGS. 8A-8B, the proximity server and the location server must periodically exchange positioning information for mobile-3 throughout the time duration allotted to the device discovery request, as it is not possible to predict when mobile-3 will move within closer geographic proximity of mobile-1. Unfortunately, it is difficult to determine an optimal time interval at which the proximity server and the location server should exchange positioning information. For instance, depending on a particular speed that mobile-3 is traveling at, if a proximity location request interval is set too high, the proximity server may miss when mobile-3 (i.e. the discoveree mobile) is located within a predefined proximity of mobile-1 (e.g. mobile-3 may move in and out of a predefined proximity of mobile-1 before a location request is exchanged between the location server and the proximity server). Alternatively, if a proximity location request interval is set too low, significant network and radio resources (and also mobile battery) are consumed for positioning.

Conventional proximity based services yield a number of potential applications, e.g., friend finding, gaming, etc. A common example of a proximity based service is geofencing (AKA area event location service or area watching).

A geofencing service/area event location service is a conventional service that generates an event based notification each time a target mobile device enters or exits a predefined geographic area. A geofencing service/area event location service thus utilizes both proximity based services and predefined location information to alert requesting subscriber devices to the whereabouts of a target mobile device. For instance, a geofencing service may send an event based notification to a requesting subscriber device whenever a target mobile device enters or exits a predefined geographic area.

Existing device discovery solutions for proximity based services include: a mobile-centric device discovery solution and a network-centric device discovery solution. In a mobile-centric device discovery solution, a proximity based services enabled device uses radio technology to identify other mobile devices located within a predefined proximity zone. For instance, a proximity based services enabled device may evaluate its proximity to another mobile device by assessing radio technology to identify other mobile devices located within a predefined proximity zone. For instance, a proximity based services enabled device may evaluate its proximity to another mobile device by assessing radio signal strength received from that mobile device.

A network-centric device discovery solution for proximity based services is rooted in existing location based services for mobile networks.

SUMMARY OF THE INVENTION

A system and method for enabling efficient device discovery for proximity based services comprises a network-centric device discovery solution that leverages an area event location service.

The inventive network-centric device discovery solution with area event location service utilizes a proximity server and a location server. The location server retrieves location information for proximity based services enabled devices, responds to area event location requests, and manages area event location services, etc., whereas the proximity server manages subscriber data for proximity based services and receives and responds to device discovery requests initiated by discoverer mobiles (i.e. mobile devices that have initiated a device discovery request).

In accordance with the principles of the present invention, when a proximity server receives a request for device discovery from a discoverer mobile (i.e. a mobile device that has initiated a device discovery request), the proximity server searches for mobile devices that are both subscribed to the same proximity service group as the discoverer mobile and camped on the same cell (e.g. cell global identity (CGI) and/or zone (e.g. location area identity (LAI), routing area identity (RAI), tracking area identity (TAI)) as the discoverer mobile.

In accordance with the principles of the present invention, if the proximity server finds a mobile device that is both subscribed to the same proximity service group as a discoverer mobile and located within a same cell as a discoverer mobile, the proximity server sends a location request to the location server to request location information for the potential discoveree device (i.e. a device that is potentially located within a predefined proximity of a discoverer mobile).

If the proximity server determines that the potential discoveree device is located within a predefined proximity of the discoverer mobile, the proximity server sends a proximity alert message to the discoverer mobile to notify the discoverer mobile that a discoveree device (i.e. a device located within a predefined proximity of a discoverer device) is located within a predefined proximity of the discoverer mobile and thus further communication with this device is now possible.

Alternatively, if the proximity server finds a mobile device that is both subscribed to the same proximity service group as the discoverer mobile and located within the same zone (e.g. location area identity (LAI), routing area identity (RAI), tracking area identity (TAI)) as the discoverer mobile (but not located within the same cell as the discoverer mobile), the proximity server initiates an area event, via the location server, for the potential discoveree device. The proximity server preferably defines the area event so that the proximity server is alerted each time a potential discoveree device moves into an area of an E-CGI and/or a WiFI access point where the discoverer mobile attaches.

In accordance with the principles of the present invention, if the proximity server receives an area event notification for the potential discoveree device, indicating that the potential discoveree device has moved into an area of an Evolved Universal Terrestrial Access Network (E-UTRAN) cell global identity (E-CGI) and/or a WiFi access point where the discoverer mobile attaches, the proximity server sends a location request to the location server to request location information for the potential discoveree device.

If location information returned from the location server for the potential discoveree device indicates that the potential discoveree device has moved into a predefined proximity of the discoverer mobile, the proximity server sends a proximity alert message to the discoverer mobile to notify the discoverer mobile that a mobile device is located within a predefined proximity of the discoverer mobile and thus further communication with this device is now possible.

Alternatively, if it is determined that the potential discoveree device is not located within a predefined proximity of the discoverer mobile, the proximity server waits for an area event notification from the location server.

The inventive device discovery solution is more efficient and more accurate than existing network-centric device discovery solutions.

BRIEF DESCRIPTION OF THE DRAWINGS

Features and advantages of the present invention will become apparent to those skilled in the art from the following description with reference to the drawings, in which:

FIGS. 2A-2C depicts an exemplary network-centric device discovery solution with area event location service, in accordance with the principles of the present invention.

FIGS. 3A-3C depicts an exemplary network-centric device discovery solution with area event location service where the discoverer mobile moves significantly during the device discovery procedure, in accordance with the principles of the present invention.

DETAILED DESCRIPTION OF ILLUSTRATIVE EMBODIMENTS

The present invention extends conventional area event location services, as described in U.S. Pat. Nos. 7,764,961 and 8,249,589, (both explicitly incorporated herein by reference) and implements methods of network-centric device discovery to provide a more efficient device discovery procedure for proximity based services.

Device discovery for proximity based services is conventionally achieved via several different methods. For instance, a proximity based services enabled device operating on a wireless network that supports proximity based services may implement radio frequency (RF) device discovery (i.e. neighbor discovery) by periodically generating a peer discovery signal, in synchronization with the wireless network.

Alternatively, a proximity server and an associated location server may provide device discovery by continuously requesting location information for potential discoveree devices (i.e. devices potentially located within a predefined proximity of a discoverer mobile) that are located nearby a discoverer mobile (i.e. a device that has initiated a device discovery request).

The present invention leverages an existing area event location service to provide a more efficient device discovery procedure for proximity based services.

An area event location service is a conventional service that generates an event based notification each time a predefined area event occurs, e.g., each time a target mobile device enters or exits a predefined geographic area.

The inventive device discovery procedure is based on a conventional network-centric device discovery solution.

Figure 1:
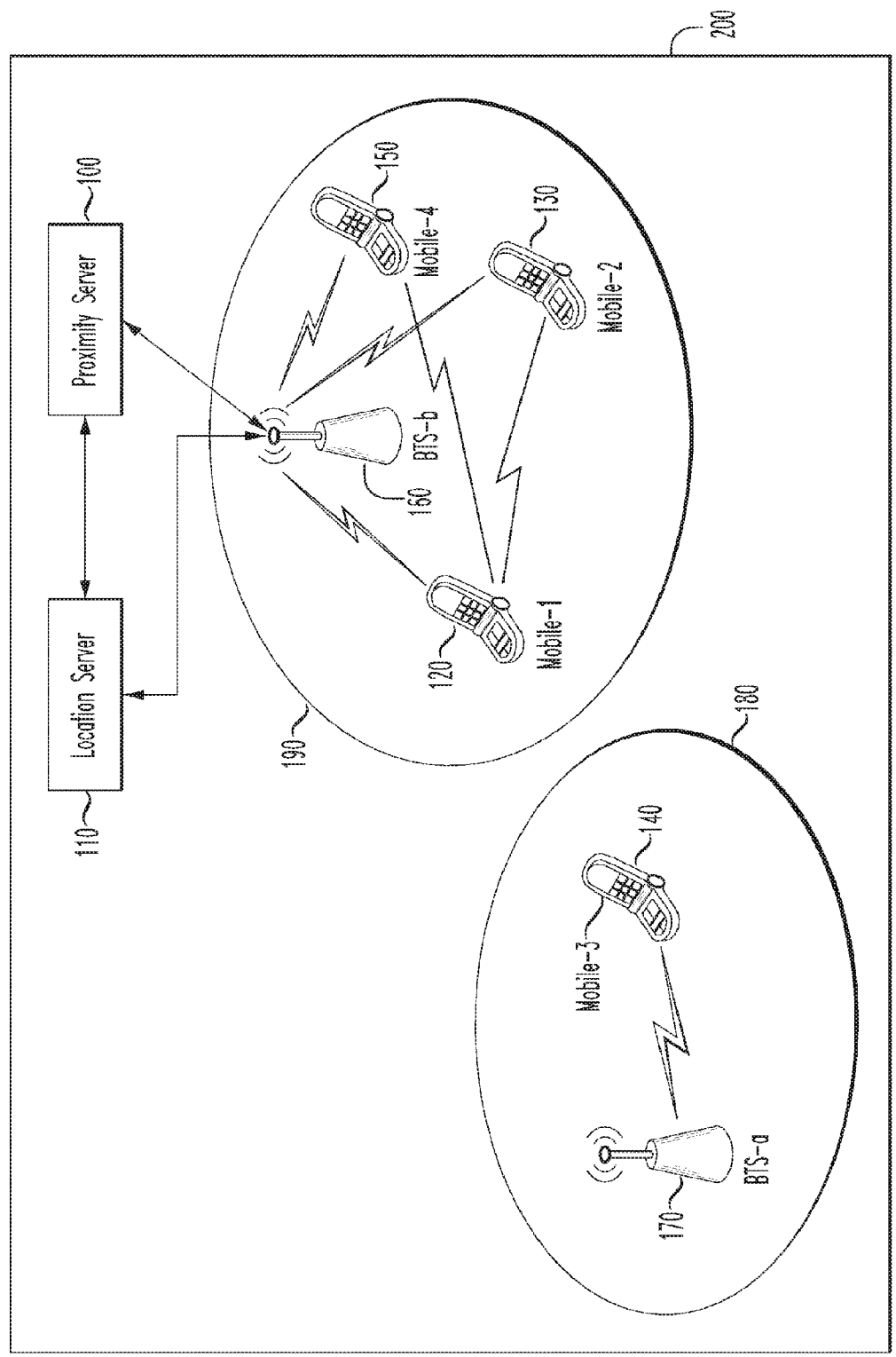
FIG. 1 depicts an exemplary network context diagram showing a proximity based service that provides network-centric device discovery for proximity based services, in accordance with the principles of the present invention.

FIG. 1 depicts an exemplary network context diagram showing a proximity based service that provides network-centric device discovery for proximity based services, in accordance with the principles of the present invention.

As depicted in FIG. 1, a network-centric device discovery solution preferably utilizes both a proximity server 100 and a location server 110. In accordance with the principles of the present invention, a proximity server 100 in a network-centric device discovery solution manages subscriber data for proximity based services and receives and responds to device discovery requests. For example, the proximity server 100 may maintain: subscriptions to proximity based services, subscriber device relationships (e.g. subscriber devices' current proximity to one another, subscriber devices currently engaged in peer-to-peer (p2p) communications, etc.), associated service identifiers (e.g. unique proximity based service identifiers), etc.

The location server 110 in a network-centric device discovery solution preferably retrieves location information for proximity based services enabled devices, responds to area event location requests, and manages area event location services, etc.

Figure 7:
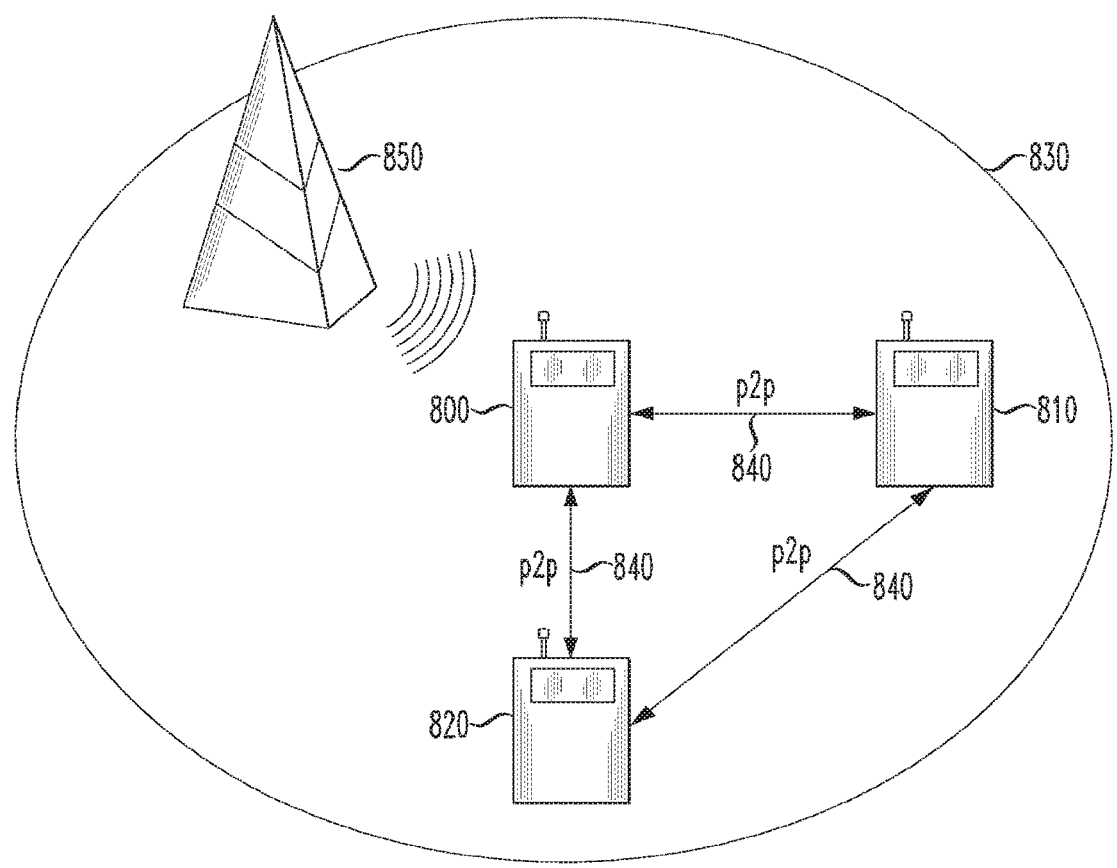
FIG. 7 depicts a conventional illustrative example of direct peer-to-peer (p2p) communications for proximity based services.
Figure 8A:
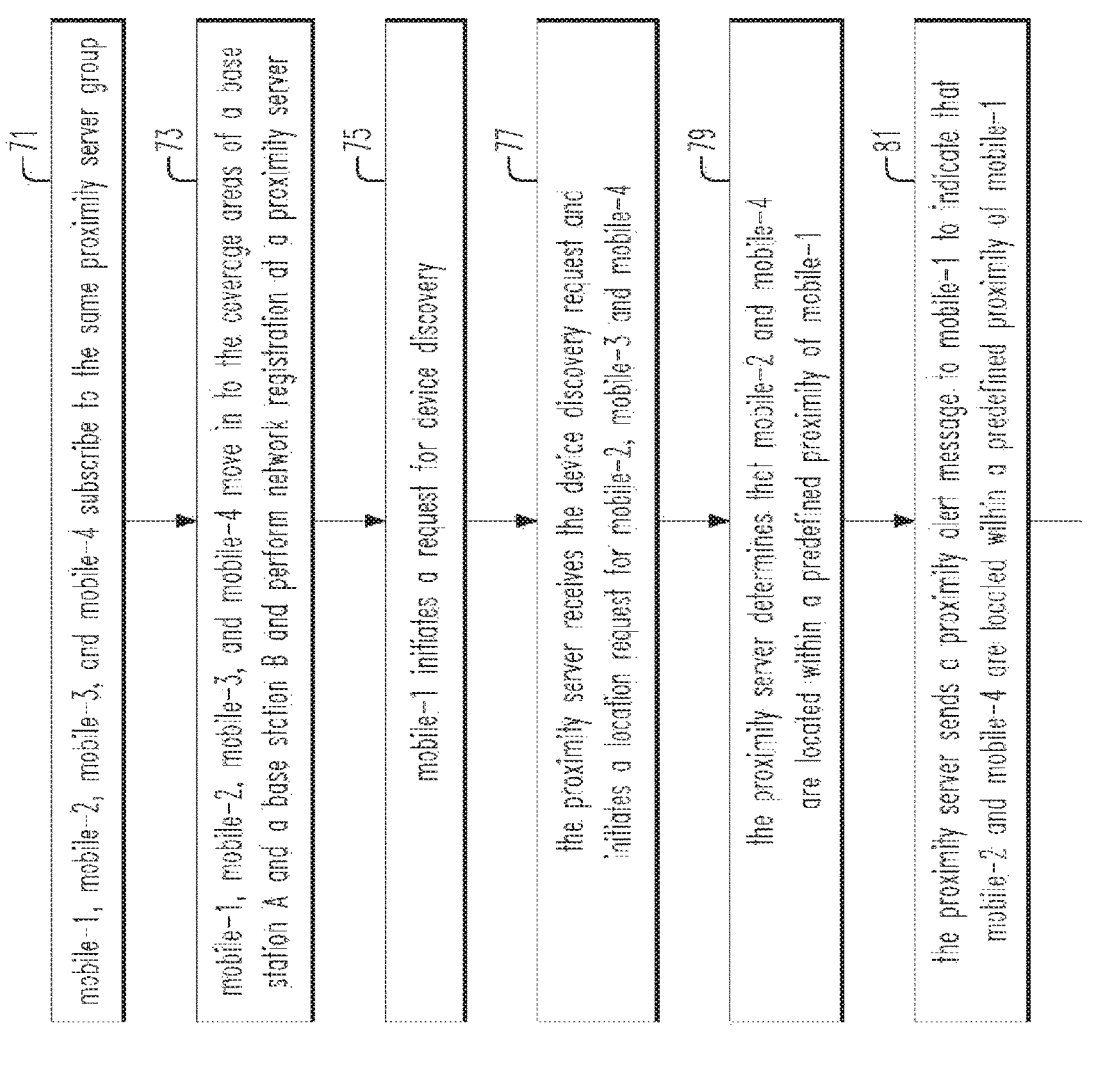
FIGS. 8A-8B depicts a conventional network-centric device discovery method.
Figure 8B:
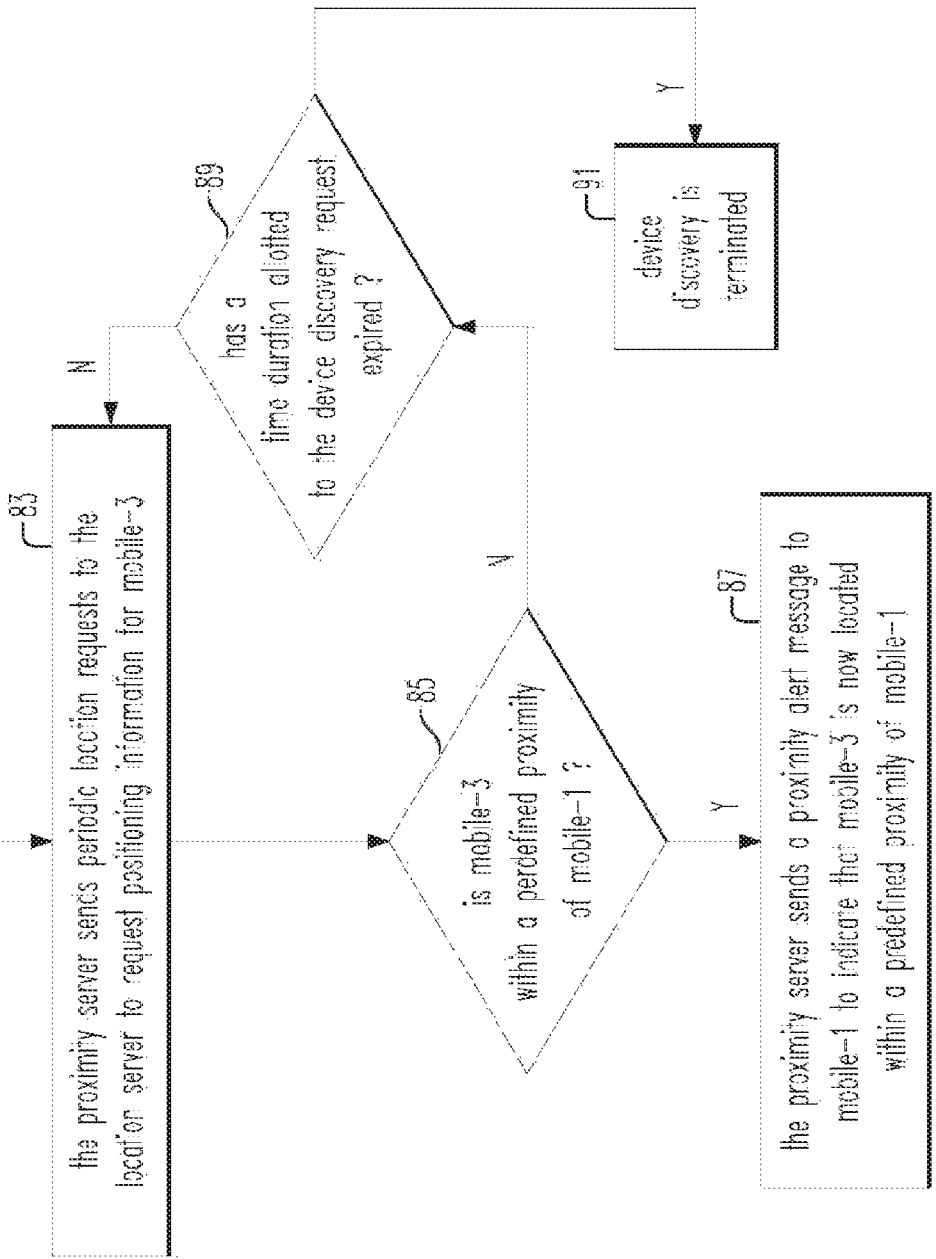

As described above, the conventional network-centric device discovery method shown in FIG. 7 does not leverage area event location services as provided herein by the present invention. The present invention provides a system and method for efficiently processing device discovery requests using area event location services (also known as geofencing).

Figure 2A:
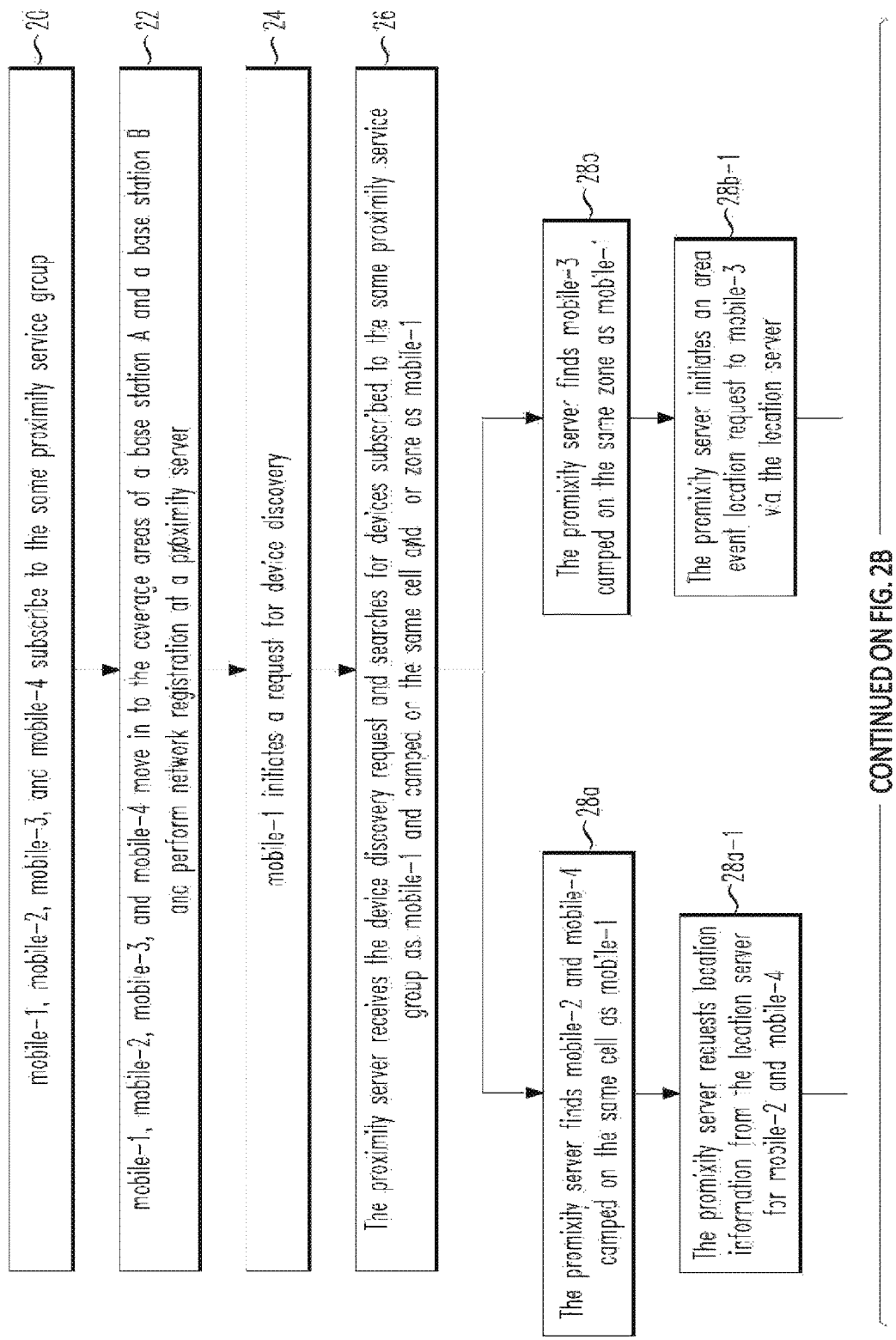

FIGS. 2A-2C depicts an exemplary network-centric device discovery solution with area event location service, in accordance with the principles of the present invention.

In particular, as portrayed in step 20 of FIG. 2A, a mobile-1 120, a mobile-2 130, a mobile-3 140, and a mobile-4 150 all subscribe to the same proximity service group.

As shown in step 22, the mobile-1 120, mobile-2 130, mobile-3 140, and mobile-4 150 then move in to the coverage areas of a base station B (BTS-B) 160 and a base station A (BTS-A) 170, respectively, and all are registered by mobile identifier, cell-ID (e.g. cell global identifier (CGI) or E-UTRAN cell global identifier (ECGI)), and other network identifiers (e.g. location area identifier (LAI), routing area identifier (RAI), tracking area identity (TAI), public land mobile network identifier (PLMN-ID)) at a proximity server 100. Mobile-3 140 is serviced by base station A (BTS-A) 170, while mobile-1 120, mobile-2 130, and mobile-4 150 are all serviced by base station B (BTS-B) 160. Mobile-3 140 is not located within the same cell 190 as mobile-1 120, mobile-2 130, and mobile-4 150, but is located within the same zone (e.g. in the same TAI, RAI, LAI) 200 as mobile-1 120, mobile-2 130, and mobile-4 150. Mobile-3 140 is not located within close geographic proximity of mobile-1 120, mobile-2 130, and mobile-4 150.

As shown in step 24, mobile-1 120 sends a device discovery request to the proximity server 100 to request location information for mobile devices (e.g. mobile-2 130, mobile-3 140, and mobile-4 150) subscribed to the same proximity service group as mobile-1 1120. Mobile-1 120 preferably forwards the following information with the device discovery request: a proximity services (ProSe) service type, a mobile identifier, a proximity services (ProSe) group ID, current location information, serving network information (e.g. public land mobile network identifier (PLMN-ID), a location area identifier (LAI)/routing area identifier (RAI)/tracking area identity (TAI), cell global identifier (CGI)/E-UTRAN cell global identifier (ECGI), wifi access point address, etc.), etc.

As depicted in step 26, the proximity server 100 receives the device discovery request initiated by mobile-1 120 and searches for proximity based services enabled devices that are both: subscribed to the same proximity service group as mobile-1 120 and camped on the same cell (e.g. ECGI) 190 and/or zone (e.g. location area identity (LAI), routing area identity (RAI), tracking area identity (TAI)) as mobile-1 120.

As shown in steps 28a and 28a-1 of FIG. 2A, if the proximity server 100 finds devices that are both subscribed to the same proximity service group as mobile-1 120 and camped on the same cell 190 as mobile-1 120, the proximity server 100 requests location information for such devices from the location server 110. For instance, in the example portrayed in FIG. 1, the proximity server finds both mobile-2 130 and mobile-4 150 camped on the same cell 190 as mobile-1 120 and thus requests location information for mobile-2 130 and mobile-4 150 from the location server 110.

As shown in step 28a-2 of FIG. 2A, once the proximity server 100 receives location information for mobile-2 130 and mobile-4 150 from the location server 110, the proximity server 100 calculates the distance between mobile-1 120 and mobile-2 130 and mobile-1 120 and mobile-4 5 150, and finds that mobile-2 130 is currently located with a predefined proximity of mobile-1 120, while mobile-4 150 is not. Using this information, the proximity server 100 transmits a proximity alert message to mobile-1 120 to indicate that mobile-2 130 is currently located within a predefined proximity of mobile-1 120, and thus further communication with mobile-2 is now possible, as portrayed in step 28a-3.

As portrayed in step 28a-4, the proximity server 100 periodically requests location information for mobile-4 150 throughout the duration of time allotted to the device discovery request. If during this time, the proximity server 100 finds that mobile-4 150 has moved within a predefined proximity of mobile-1 120 (step 28a-5), the proximity server 100 sends a proximity alert message to mobile-1 120 to notify mobile-1 120 of this occurrence, as shown in step 28a-6.

Alternatively, as portrayed in step 28a-7, if location information indicates that mobile-4 150 is not located within a predefined proximity of mobile-1 120, the proximity server 100 continues to send periodic location requests to the location server 110 for mobile-4 150, as long as a time duration allotted to the device discovery request is not expired.

If the time duration allotted to the device discovery request has expired, device discovery is terminated, as shown in step 28a-8.

Moreover, if the proximity server 100 finds a device that is both subscribed to the same proximity service group as the discoverer mobile and camped on the same zone as the discoverer mobile, but not camped in the same cell as the discoverer mobile, the proximity server 100 defines an area event for the potential discoveree device.

For instance, in the example depicted in FIG. 1, the proximity server 100 finds that mobile-3 140 is both subscribed to the same proximity service group as mobile-1 120 and located within the same zone 200 as mobile-1 120 (but not located within the same cell 190 as mobile-1 120), as portrayed in step 28*b* of FIG. 2A.

As shown in step 28*b*-1, the proximity server 100 then initiates an area event location request, via the location server 110, to mobile-3 140. The area event location request is preferably defined so that an area event notification is sent to the proximity server 100 each instance mobile-3 140 (i.e. the potential discoveree mobile) enters the 10 area of an E-CGI and/or a WiFi access point where mobile-1 (i.e. the discoverer mobile) 120 attaches. The proximity server 100 preferably allots the same time duration to the area event location request as has been allotted to the device discovery request.

As depicted in step 28*b*-2, the proximity server 100 then waits for an area event notification from the location server 110.

As shown in steps 28*b*-3 and 28*b*-4*a*, if the proximity server 100 does not receive an area event notification for mobile-3 140 within a time duration allotted to the area event location request, the area event location request is terminated.

Alternatively, as shown in step 28*b*-4*b*, if the proximity server 100 does receive an area event notification for mobile-3 140, indicating that mobile-3 140 has entered the area of an E-CGI and/or a WiFi access point where mobile-1 120 (i.e. the discoverer mobile) attaches, the proximity server 100 sends a location request to the location server 110 to request location information for mobile-3 140.

In step 28*b*-5, the location server 110 returns location information for mobile-3 140 to the proximity server 100 and the proximity server 100 uses the location information to calculate the distance between mobile-1 120 and mobile-3 140. The proximity server 100 then uses the calculated distance to determine whether or not mobile-3 140 is located within a predefined proximity of mobile-1 120.

As shown in steps 28*b*-6 and 28*b*-7, if mobile-3 140 is located within a predefined proximity of mobile-1 120, the proximity server 100 sends a proximity alert message to mobile-1 120 to notify mobile-1 120 that mobile-3 140 is now located within a predefined proximity of mobile-1 120, and thus further communication with mobile-3 140 is now possible.

Alternatively, as depicted in step 28*b*-8, if mobile-3 140 is not located within a predefined proximity of mobile-1 120, the proximity server 100 sends an additional location request for mobile-3 140 to the location server 110 (step 28*b*-4*b*), as long as a time duration allotted to the device discovery request has not yet expired.

If a time duration allotted to the device discovery request has expired, device discovery is terminated, as portrayed in step 28*b*-9.

Figure 3A:
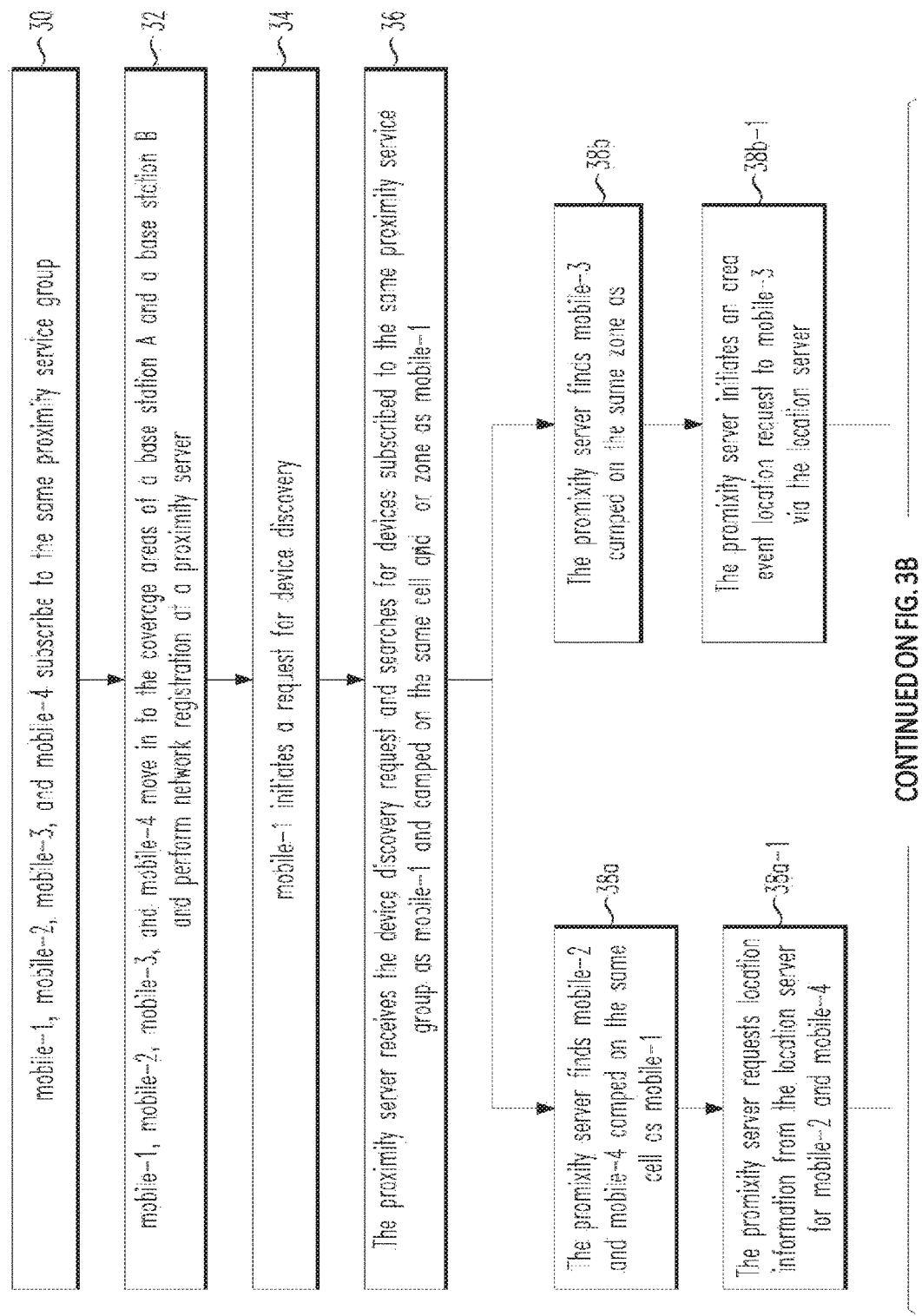
Figure 3B:
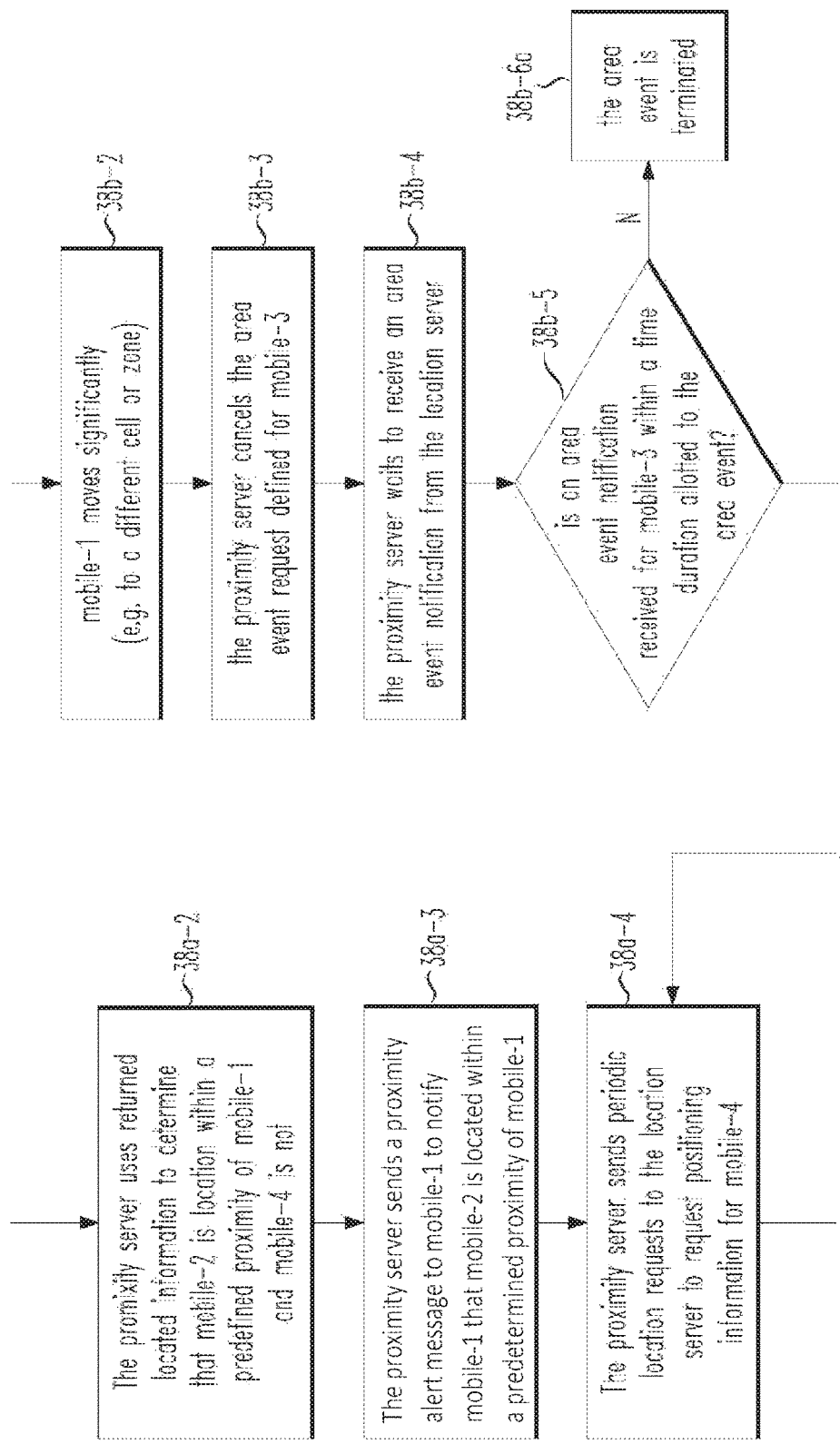

FIGS. 3A-3C depicts an exemplary network-centric device discovery solution with area event location service, where the discoverer mobile moves significantly during the device discovery procedure, in accordance with the principles of the present invention.

In particular, as portrayed in step 30 of FIG. 3A, a mobile-1 120, a mobile-2 130, a mobile-3 140, and a mobile-4 150 all subscribe to the same proximity service group.

As shown in step 32, the mobile-1 120, mobile-2 130, mobile-3 140, and mobile-4 150 then move in to the coverage areas of a base station B (BTS-B) 160 and a base station A (BTS-A) 170, respectively, and all are registered by mobile identifier, cell-ID (e.g. cell global identifier (CGI) or E-UTRAN cell global identifier (ECGI)), and other network identifiers (e.g. location area identifier (LAI), routing area identifier (RAI), tracking area identity (TAI), public land mobile network identifier (PLMN-ID)) at a proximity server 100. Mobile-3 140 is serviced by base station A (BTS-A) 170, while mobile-1 120, mobile-2 130, and mobile-4 150 are all serviced by base station B (BTS-B) 160. Mobile-3 140 is not located within the same cell 190 as mobile-1 120, mobile-2 130, and mobile-4 150, but is located within the same zone (e.g. in the same TAI, RAI, LAI) 200 as mobile-1 120, mobile-2 130, and mobile-4 150. Mobile-3 140 is not located within close geographic proximity of mobile-1 120, mobile-2 130, and mobile-4 150.

As shown in step 34, mobile-1 120 sends a device discovery request to the proximity server 100 to request location information for mobile devices (e.g. mobile-2 130, mobile-3 140, and mobile-4 150) subscribed to the same proximity service group as mobile-1 120. Mobile-1 120 preferably forwards the following information with the device discovery 10 request: a proximity services (ProSe) service type, a mobile identifier, a proximity services (ProSe) group ID, current location information, serving network information (e.g. public land mobile network identifier (PLMN-ID), a location area identifier (LAI)/routing area identifier (RAI)/tracking area identity (TAI), cell global identifier (CGI)/E-UTRAN cell global identifier (ECGI), wifi access point address, etc.), etc.

As depicted in step 36, the proximity server 100 receives the device discovery request initiated by mobile-1 120 and searches for proximity based services enabled devices that are both: subscribed to the same proximity service group as mobile-1 120 and camped on the same 20 cell (e.g. ECGI) 190 and/or zone (e.g. location area identity (LAI), routing area identity (RAI), tracking area identity (TAI)) as mobile-1 120.

As shown in steps 38*a* and 38*a*-1 of FIG. 3A, if the proximity server 100 finds devices that are both subscribed to the same proximity service group as mobile-1 120 and camped on the same cell 190 as mobile-1 120, the proximity server 100 requests location information for such devices from the location server 110. For instance, in the example portrayed in FIG. 1, the proximity server finds both mobile-2 130 and mobile-4 150 camped on the same cell 190 as mobile-1 120 and thus requests location information for mobile-2 130 and mobile-4 150 from the location server 110.

As shown in step 38*a*-2 of FIG. 3B, once the proximity server 100 receives location information for mobile-2 130 and mobile-4 150 from the location server 110, the proximity server 100 calculates the distance between mobile-1 120 and mobile-2 130 and mobile-1 120 and mobile-4 150, and finds that mobile-2 130 is currently located with a predefined proximity of mobile-1 120, while mobile-4 150 is not. Using this information, the proximity server 100 transmits a proximity alert message to mobile-1 120 to indicate that mobile-2 130 is currently located within a predefined proximity of mobile-1 120, and thus further communication with mobile-2 is now possible, as portrayed in step 38*a*-3.

As portrayed in step 38*a*-4, the proximity server 100 periodically requests location information for mobile-4 150 throughout the duration of time allotted to the device discovery request. If during this time, the proximity server 100 finds that mobile-4 150 has moved within a predefined proximity of mobile-1 120 (step 38*a*-5), the proximity server 100 sends a proximity alert message to mobile-1 120 to notify mobile-1 120 of this occurrence, as shown in step 38*a*-6.

Alternatively, as portrayed in step 38*a*-7 of FIG. 3C, if location information indicates that mobile-4 150 is not located within a predefined proximity of mobile-1 120, the proximity server 100 continues to send periodic location requests to the location server 110 for mobile-4 150, as long as a time duration allotted to the device discovery request is not expired.

If the time duration allotted to the device discovery request has expired, device discovery is terminated, as shown in step 38*a*-8.

Moreover, if the proximity server 100 finds a device that is both subscribed to the same proximity service group as the discoverer mobile and camped on the same zone as the discoverer mobile, but not camped in the same cell as the discoverer mobile, the proximity server 100 defines an area event for the potential discoveree device.

For instance, in the example depicted in FIG. 1, the proximity server 100 finds that mobile-3 140 is both subscribed to the same he proximity service group as mobile-1 120 and located within the same zone 200 as mobile-1 120 (but not located within the same cell 190 as mobile-1 120), as portrayed in step 38*b* of FIG. 3A.

As shown in step 38*b*-1, the proximity server 100 then initiates an area event location request, via the location server 110, to mobile-3 140. The area event location request is preferably defined so that an area event notification is sent to the proximity server 100 each instance mobile-3 140 (i.e. the potential discoveree mobile) enters the area of an E-CGI and/or a WiFi access point where mobile-1 (i.e. the discoverer mobile) 120 attaches. The proximity server 100 preferably allots the same time duration to the area event location request as has been allotted to the device discovery request.

As shown in step 38*b*-2 of FIG. 3B, during the time duration allotted to the device discovery request/area event location request, mobile-1 120 (i.e. the discoverer mobile) moves significantly, e.g. to a different cell or zone.

In step 38*b*-3, the proximity server 100 realizes that mobile-1 120 has moved significantly and cancels the active area event location request(s) initiated in step 38*b*-1. The proximity server 100 then repeats the device discovery process (beginning from step 36 of FIG. 3A).

Steps 38*b*-4 through 38*b*-10 are identical to steps 28*b*-2 through 28*b*-9 of FIGS. 2A-2B.

In particular, as portrayed in step 38*b*-4 of FIG. 3B, once an area event has been initiated for mobile-3 140, the proximity server 100 waits to receive an area event notification from the location server 110.

As shown in steps 38*b*-5 and 38*b*-6*a*, if the proximity server 100 does not receive an area event notification for mobile-3 140 within a time duration allotted to the area event location request, the area event location request is terminated.

Alternatively, as shown in step 38*b*-6*b*, if the proximity server 100 does receive an area event notification for mobile-3 140, indicating that mobile-3 140 has entered the area of an E-CGI and/or a WiFi access point where mobile-1 120 (i.e. the discoverer mobile) attaches, the proximity server 100 sends a location request to the location server 110 to request location information for mobile-3 140.

In step 38*b*-7, the location server 110 returns location information for mobile-3 140 to the proximity server 100 and the proximity server 100 uses the location information to calculate the distance between mobile-1 120 and mobile-3 140. The proximity server 100 then uses the calculated distance to determine whether or not mobile-3 140 is located within a predefined proximity of mobile-1 120.

As shown in steps 38*b*-8 and 38*b*-9*a*, if mobile-3 140 is located within a predefined proximity of mobile-1 120, the proximity server 100 sends a proximity alert message to mobile-1 120 to notify mobile-1 120 that mobile-3 140 is now located within a predefined proximity of mobile-1 120, and thus further communication with mobile-3 is now possible.

Alternatively, as depicted in step 38*b*-9*b*, if mobile-3 140 is not located within a predefined proximity of mobile-1 120, the proximity server 100 sends an additional location request for mobile-3 140 to the location server 110 (step 38*b*-6*b*), as long as a time duration allotted to the device discovery request has not yet expired.

If a time duration allotted to the device discovery request has expired, device discovery is terminated, as portrayed in step 38*b*-10.

In the inventive device discovery procedure using area event location service, if a proximity zone defined for device discovery using area event location service is in the same scale as a serving wireless cell, precise positioning need not be triggered (depending on the geographic size of a predefined proximity zone and a deployed wireless cell (or WiFi access point coverage)).

Detailed procedures illustrated below include a device discovery procedure of a discoverer device, a device discovery procedure of a proximity server, and a device discovery procedure of a discoveree device.

Figure 4:
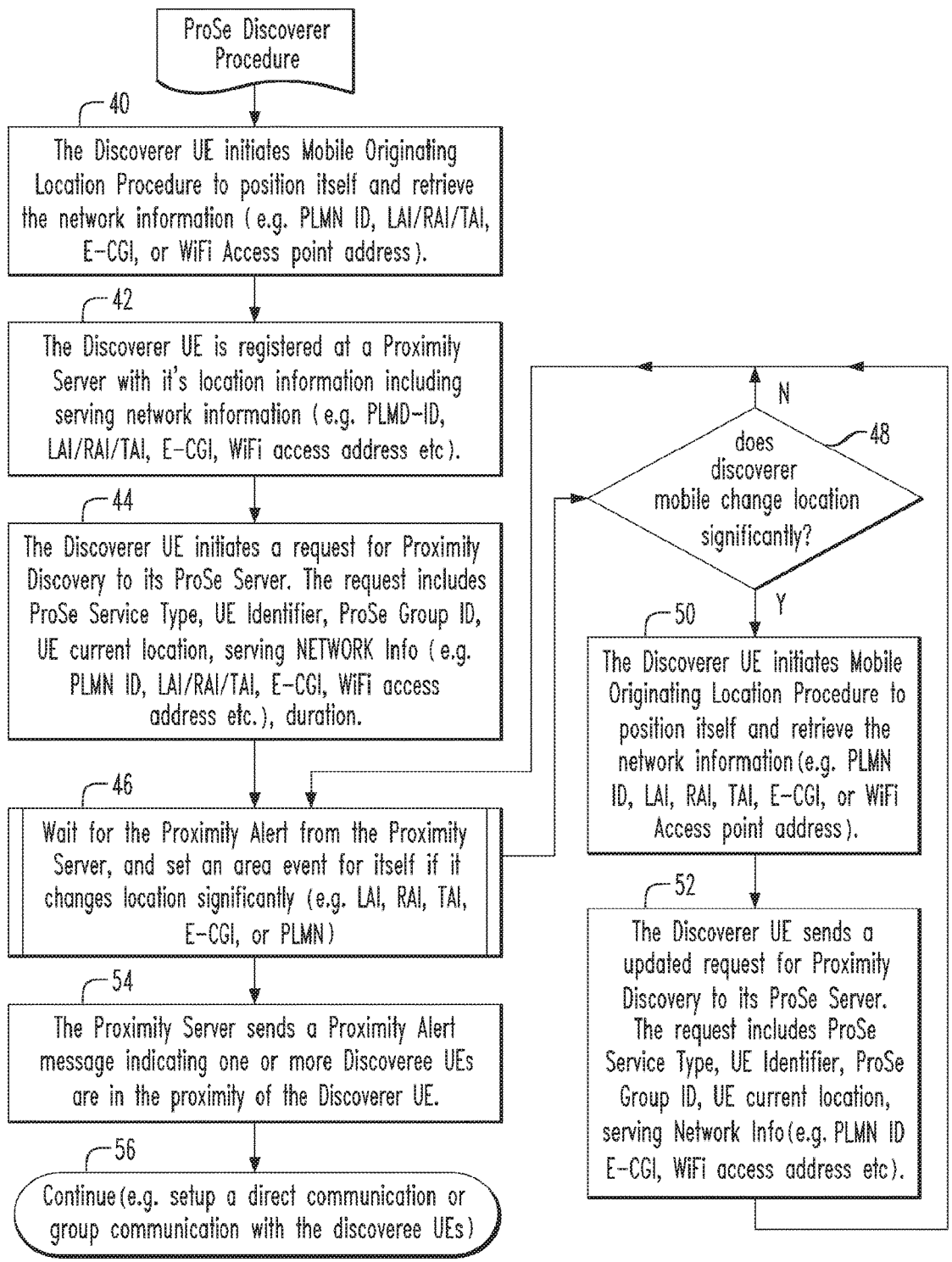
FIG. 4 shows an exemplary device discovery procedure for a discoverer mobile, in accordance with the principles of the present invention.

FIG. 4 shows an exemplary device discovery procedure for a discoverer mobile, in accordance with the principles of the present invention.

In particular, as portrayed in step 40 of FIG. 4, a discoverer mobile initiates a mobile originating location procedure to position itself and retrieve network information (e.g. PLMN-ID, LAI/RAI/TAI, E-CGI or WiFi access point address).

As shown in step 42, the discoverer mobile then uses location information and serving network information (e.g. PLMN-ID, LAI/RAI/TAI, E-CGI or WiFi access point address) retrieved in step 40 to register at a proximity server 100.

In step 44, the discoverer mobile transmits a device discovery request to the proximity server 100 and preferably includes: a proximity services (ProSe) service type, a UE identifier, a ProSe group ID, UE current location, serving network information (e.g. PLMN-10, LAI/RAI/TAI, E-CGI or WiFi access point address), and a time duration.

As portrayed in step 46, the discoverer mobile then waits to receive a proximity alert message from the proximity server 100.

As shown in steps 48 and 50 of FIG. 4, if the discoverer mobile changes location significantly during the time duration allotted to the device discovery request, the discoverer mobile sets an area event for itself and initiates a mobile originating location procedure to position itself and retrieve network information (e.g. public land mobile network (PLMN)-ID, location area identity (LAI)/routing area identity (RAI)/tracking area identity (TAI), E-UTRAN cell global identity (E-CGI), or WiFi access point address).

As shown in step 52, the discoverer mobile then sends an updated device discovery request to the proximity server 100, comprising a proximity services (ProSe) service type, a UE identifier, a ProSe group ID, UE current location, and serving network information (e.g. PLMN-ID, LAI/RAI/TAI, E-CGI or WiFI access point address), and then continues to wait for a proximity alert message from the proximity server 100 (step 46).

Alternatively, if the discoverer mobile does not change location significantly during the time duration allotted to the device discovery request, the discoverer mobile continues to wait for a proximity alert message from the proximity server 100 (step 46).

In step 54, the discoverer mobile receives a proximity alert message from the proximity server 100, indicating that one or more discoveree mobiles are located within a predefined proximity of the discoverer mobile.

As shown in step 56, the discoverer mobile can now set up a direct communication or group communication with the one or more discoveree mobiles located within a predefined proximity of the discoverer mobile.

FIGS. 5A-5D depicts an exemplary device discovery procedure of a proximity server, in accordance with the principles of the present invention.

Figure 5A:
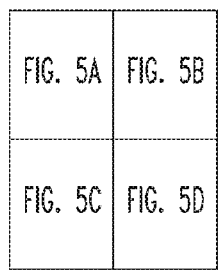
FIGS. 5A-5D depicts an exemplary device discovery procedure for a proximity server, in accordance with the principles of the present invention.
Figure 5A:
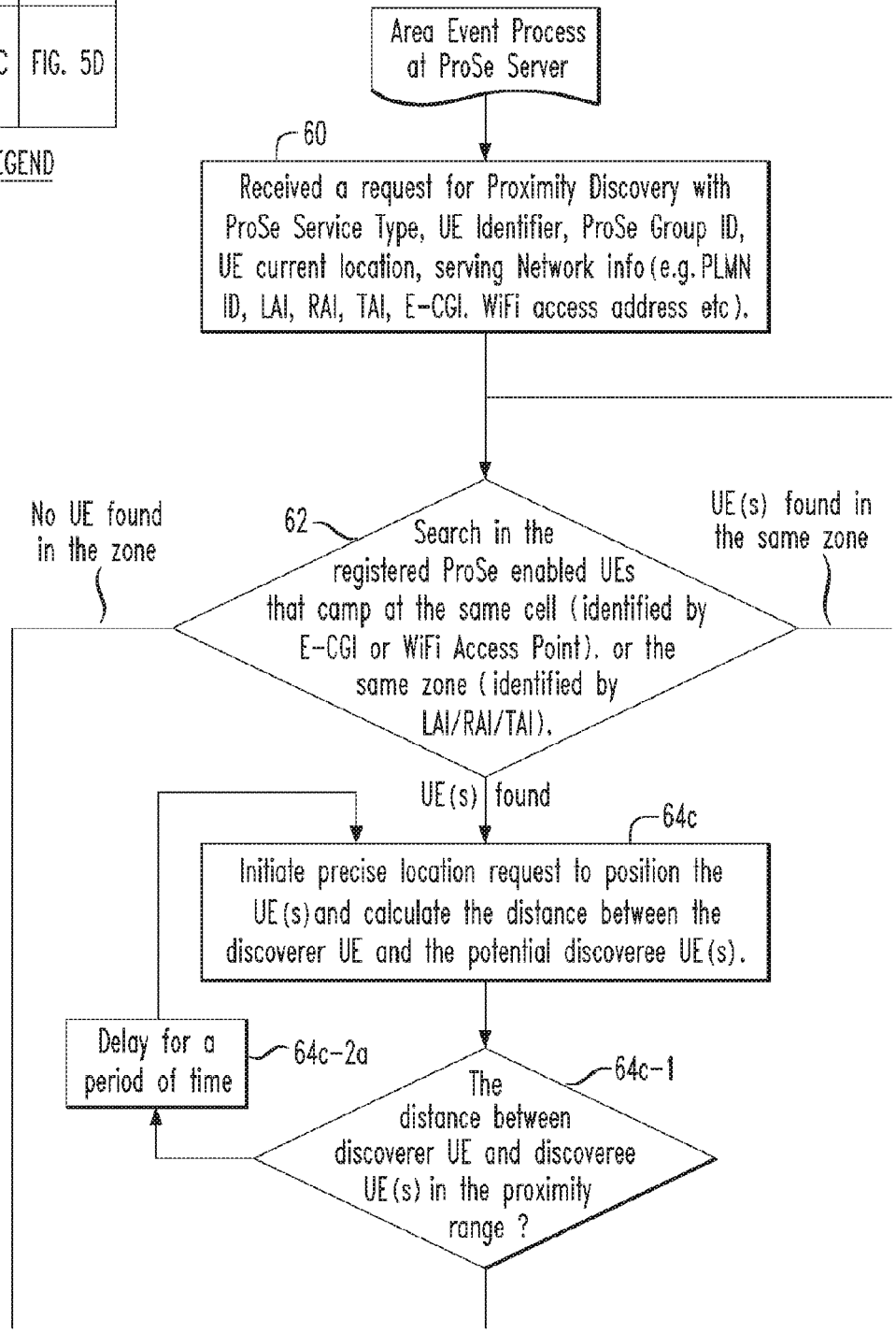

As shown in step 60 of FIG. 5A, a proximity server 100 receives a device discovery request, with a proximity services (ProSe) service type, a UE identifier, a proximity services (ProSe) group ID, UE current location information, and serving network information (e.g., PLMN-ID, LAI, RAI, TAI, E-CGI, WiFI access address, etc.), from a discoverer mobile.

As portrayed in step 62, the proximity server 100 searches for proximity based services enabled devices that are both subscribed to the same proximity service group as the discoverer mobile, and camped on the same cell (e.g. E-CGI or WiFi access point) and/or zone (e.g. LAI, RAI, TAI) as the discoverer mobile.

If the proximity server 100 is unable to find any devices camping on the same cell and/or zone as the discoverer mobile, the proximity server 100 returns a result of 'no UE found' to the discoverer mobile in response to the device discovery request, as portrayed in step 64a.

Figure 5B:
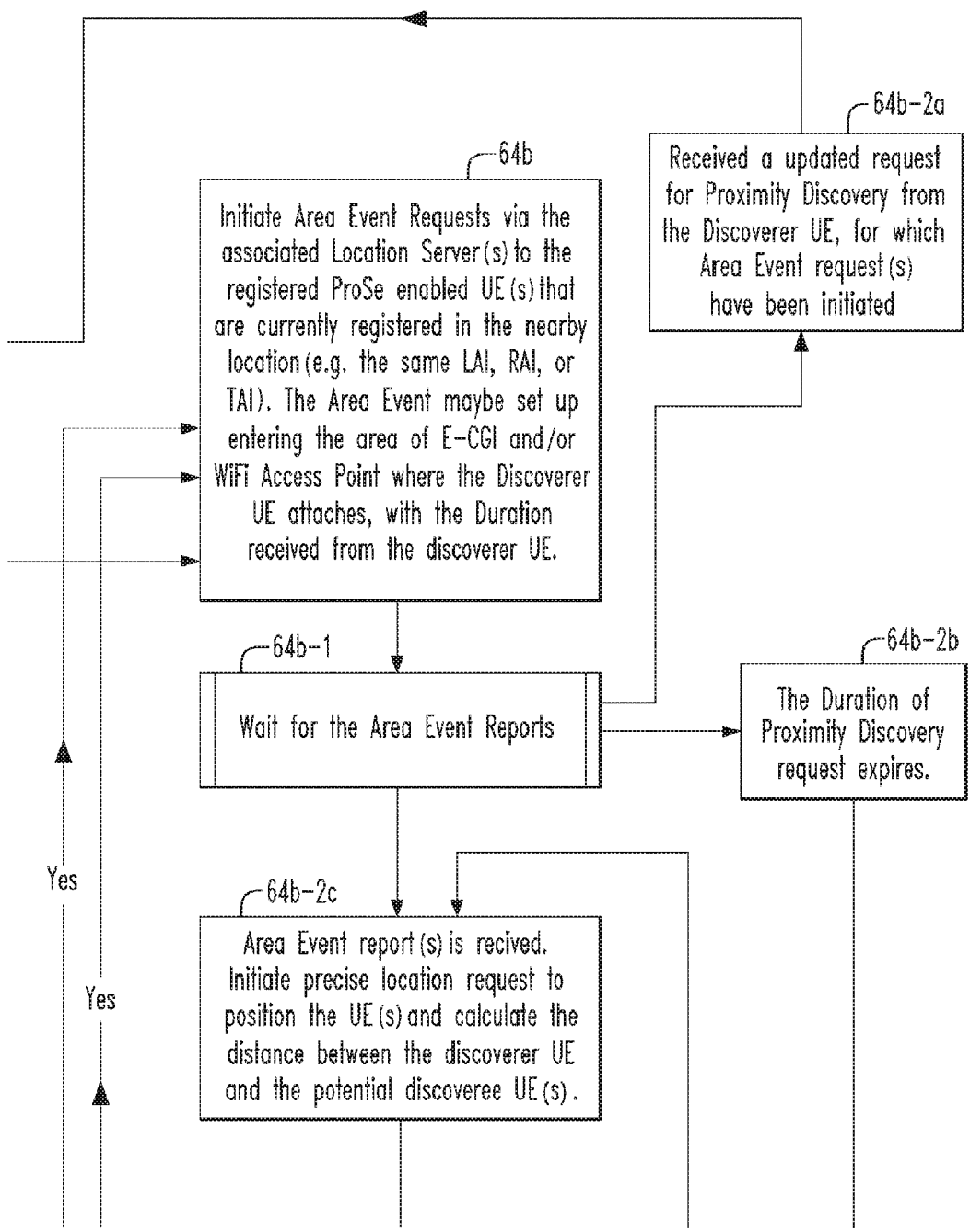
Figure 5C:
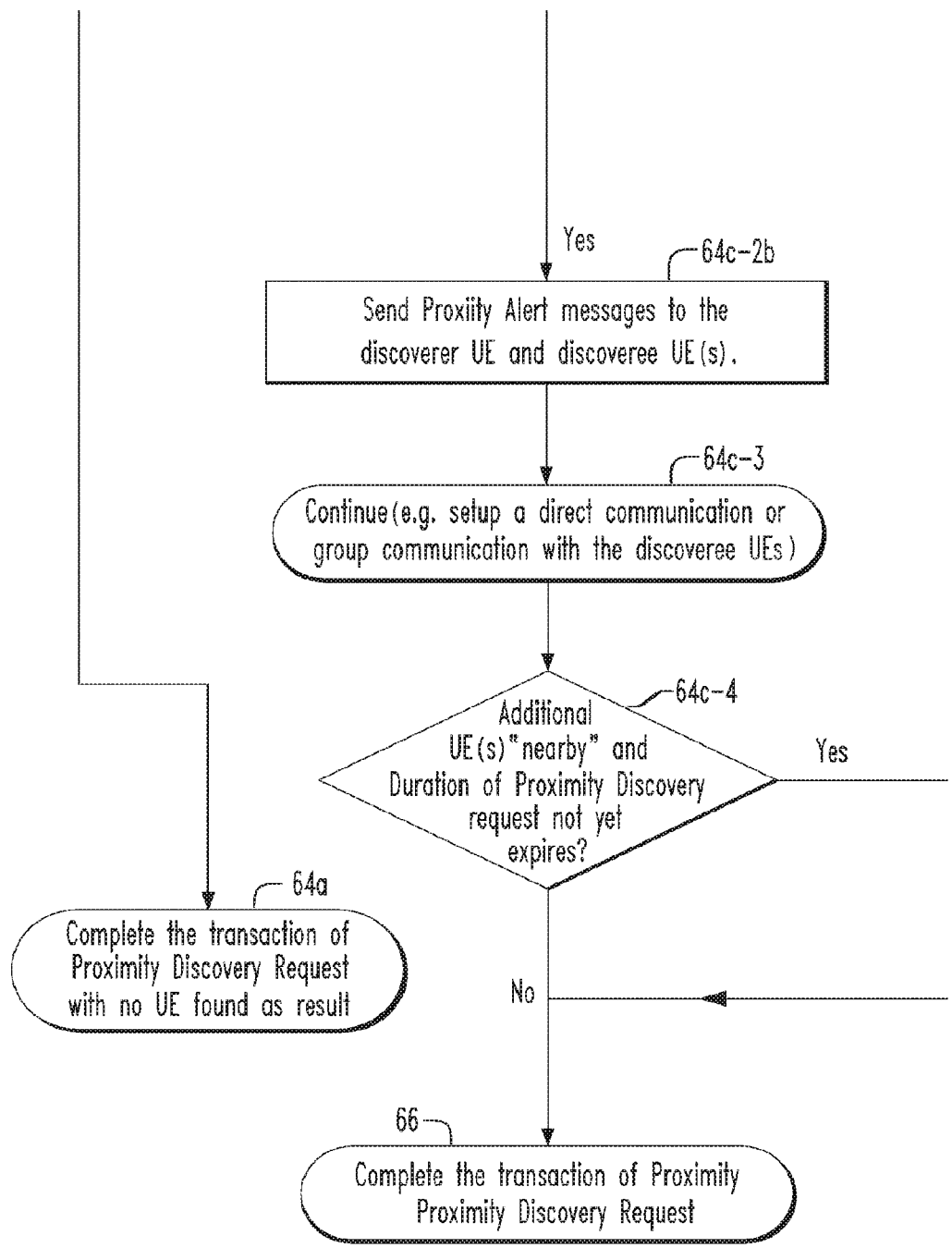
Figure 5D:
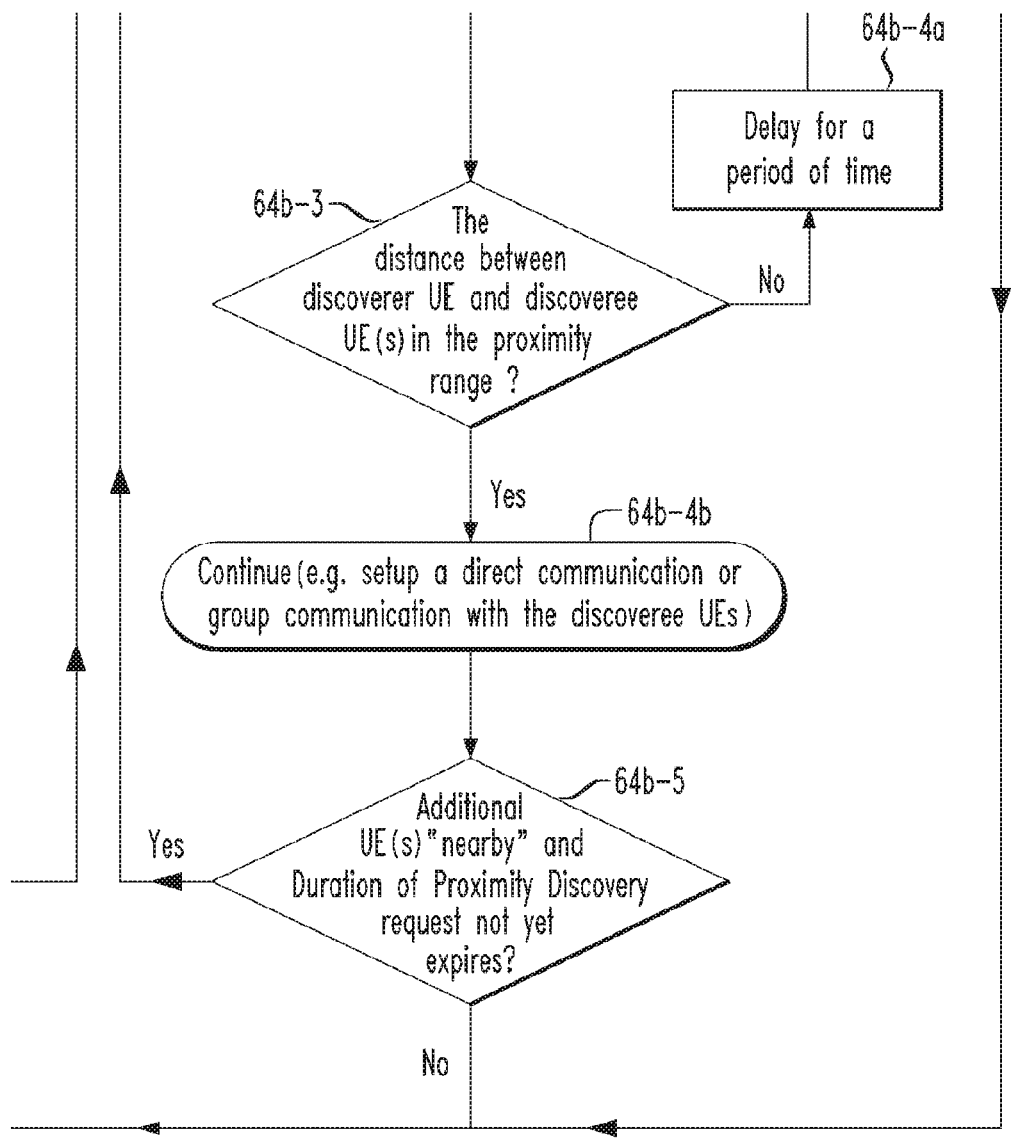

Rather, if the proximity server 100 identifies a mobile device camped in the same zone (e.g. LAI, RAI, TAI) as the discoverer mobile, but not camped in the same cell as the discoverer mobile, the proximity server 100 defines an area event, via one or more associated location servers 110, for the identified proximity services enabled device, as portrayed in step 64b of FIG. 5B. The area event is preferably defined so that an area event notification is sent to the proximity server 100 each time the identified proximity services enabled device enters the area of an E-CGI and/or a WiFI access point where the discoverer mobile attaches. The proximity server 100 preferably allots the same time duration to the area event location request as has been allotted to the device discovery request.

As shown in step 64b-1, the proximity server 100 subsequently waits to receive an area event notification from the location server 110.

As portrayed in step 64b-2a, if the proximity server 100 receives an updated request for device discovery from the discoverer mobile, indicating that the discoverer mobile has moved significantly since the receipt of the first device discovery request, the proximity server 100 repeats step 62 of FIG. 5A, i.e., searches for proximity based services enabled devices that are both subscribed to the same proximity service group as the discoverer mobile and camped on the same cell (e.g. E-CGI or WiFi access point) and/or zone (e.g. LAI, RAI, TAI) as the discoverer mobile.

As portrayed in step 64b-2b, if the time duration allotted to the area event location request expires before the proximity server 100 receives any area event notifications from the location server 110, the proximity server 100 terminates the area event location request (step 66).

Alternatively, as portrayed in step 64b-2c, if the proximity server 100 does receive an area event notification during the time duration allotted to the area event location request, indicating that the mobile device indentified in step 64b has moved into an area of an E-CGI and/or a WiFI access point where the discoverer mobile attaches, the proximity server 100 sends a precise location request to the location server 110 to position the mobile device for which the area event notification has been received. The proximity server 100 then calculates the distance between the discoverer mobile and the potential discoveree mobile (i.e. the device that is potentially located within a predefined proximity of the discoverer mobile).

As shown in step 64b-3, the proximity server 100 subsequently determines whether the distance calculated between the discoverer mobile and the potential discoveree mobile indicates that the potential discoveree mobile is located within a predefined proximity of the discoverer mobile.

As shown in step 64b-4a, if the proximity server 100 determines that the potential discoveree mobile is not located within a predefined proximity of the discoverer mobile, the proximity server 100 delays for a period of time, and then repeats step 64b-2c of FIG. 5B, i.e., sends another precise location request to the location server 110 to position the mobile device for which the area event notification has been received and calculates the distance between the discoverer mobile and the potential discoveree mobile.

Alternatively, as shown in step 64b-4b, if the proximity server 100 determines that the potential discoveree mobile is located within a predefined proximity of the discoverer mobile, the proximity server 100 sends a proximity alert message to the discoverer mobile to notify the discoverer mobile that a device is located within a predefined proximity of the discoverer mobile, and thus further communication is now possible.

The proximity server then continues to process the device discovery request, e.g., the proximity server 100 may setup a direct communication or a group communication with the discoveree mobile.

As shown in step 64b-5, throughout the remaining time duration allotted to the device discovery request, the proximity server 100 continues to search for any additional devices located nearby the discoverer mobile.

If, during the remaining time duration allotted to the device discovery request, the proximity server 100 finds that another mobile device has moved nearby the discoverer mobile, the proximity server 100 repeats steps 64b through 64b-5 of FIGS. 5A-5D.

Rather, if the proximity server 100 does not identify any additional mobile devices located nearby the discoverer mobile throughout the remaining time allotted to the device discovery request, the proximity server 100 terminates the device discovery request (step 66).

Moreover, as portrayed in step 64c of FIG. 5A, if in step 62, the proximity server 100 identifies a mobile device camped in the same cell as the discoverer mobile, the proximity server 100 sends a precise location request to the location server 110 to request positioning information for the discovered device. The proximity server 100 then calculates the distance between the discoverer mobile and potential discoveree mobile (i.e. the device potentially located within a predefined proximity of the discoverer mobile).

In step 64c-1, the proximity server 100 uses the distance calculated in step 64c to determine whether or not the potential discoveree mobile is located within a predefined proximity of the discoverer mobile.

As shown in step 64c-2a, if the proximity server 100 determines that the potential discoveree mobile is not located within a predefined proximity of the discoverer mobile, the proximity server 100 delays for a period of time, and then repeats step 64c, i.e., sends another precise location request to the location server 110 to position the mobile device camped in the same cell as the discoverer mobile, and calculates the distance between the discoverer mobile and the potential discoveree mobile using the location information.

Alternatively, as shown in step 64c-2b, if the proximity server 100 determines that the potential discoveree mobile is located within a predefined proximity of the discoverer mobile, the proximity server 100 sends a proximity alert message to the discoverer mobile to notify the discoverer mobile that a device is located within a predefined proximity of the discoverer mobile and thus further communication with this device is now possible. The proximity server 100 then continues to process the device discovery request, e.g., the proximity server 100 may setup a direct communication or a group communication with the discoveree mobile, as depicted in step 64c-3.

As shown in step 64c-4, throughout the remaining time duration allotted to the device discovery request, the proximity server 100 continues to search for any additional devices located nearby the discoverer mobile.

If, during the time duration allotted to the device discovery request, the proximity server 100 finds that an additional mobile device has moved nearby the discoverer mobile, the proximity server 100 performs steps 64b through 64b-5 of FIG. 5.

Rather, if the proximity server 100 does not identify any additional mobile devices located nearby the discoverer mobile throughout the remainder of time allotted to the device discovery request, the proximity server 100 terminates the device discovery request (step 66).

Figure 6:
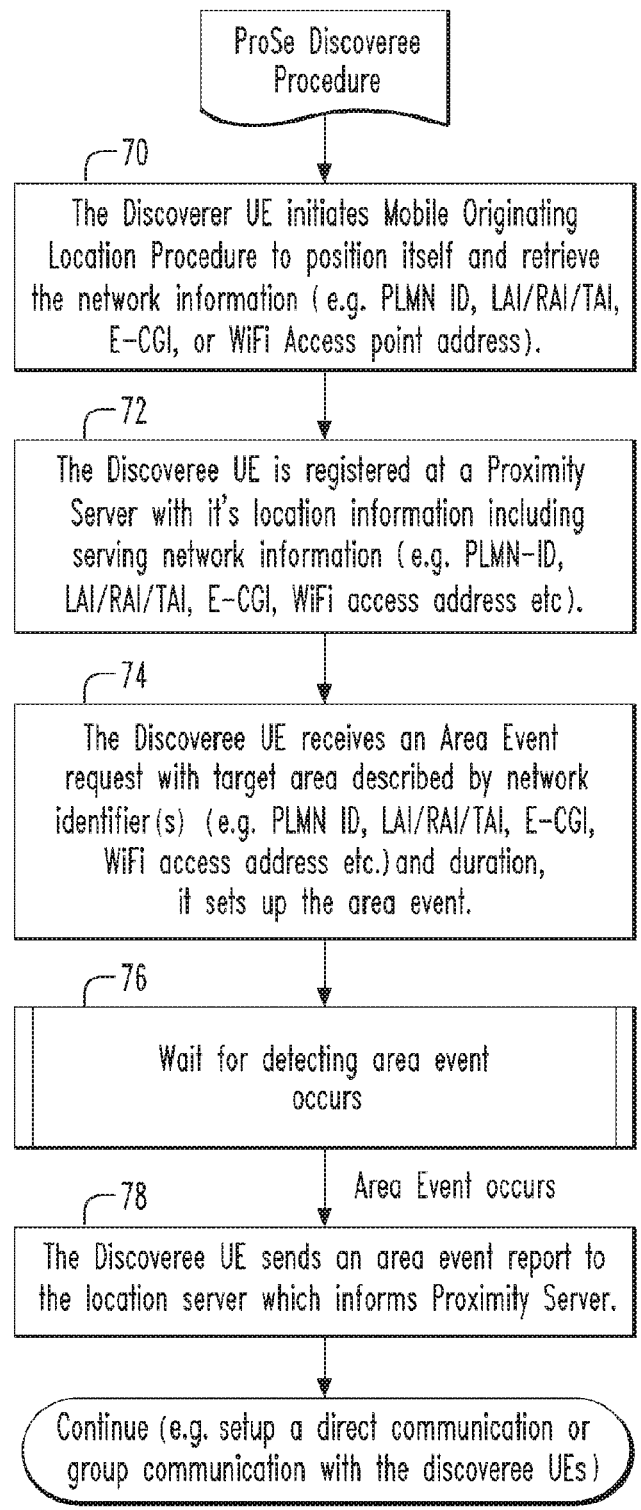
FIG. 6 shows an exemplary device discovery procedure for a discoveree mobile, in accordance with the principles of the present invention.

FIG. 6 shows an exemplary device discovery procedure for a discoveree mobile, in accordance with the principles of the present invention.

In particular, as portrayed in step 70 of FIG. 6, a discoveree mobile initiates a mobile originating location procedure to position itself and obtain network information (e.g. PLMN-ID, LAI/RAI/TAI, E-CGI or WiFI access point address).

As shown in step 72, the discoveree mobile then uses location information and serving network information (e.g. PLMN-ID, LAI/RAI/TAI, E-CGI or WiFI access point address) retrieved in step 70 to register at a proximity server 100.

In step 74, the discoveree mobile receives an area event location request from a location server 110, identifying a target area (e.g. an area of an E-CGI and/or WiFi access point where the discoverer mobile attaches) described by network identifiers (e.g. a PLMN-ID, a LAI/RAI/TAI, a E-CGI, and a WiFI access address, etc.), and a time duration. The discoveree mobile uses the area event location request to set up an area event.

As portrayed in step 76, the discoveree mobile waits for a detecting area event to occur.

In step 78, the area event occurs (e.g. the discoverer mobile moves into the area of an E-CGI and/or WiFi access point where a discoverer mobile attaches) and the discoveree mobile sends an area event report to the location server 110. The area event report is used to inform the proximity server 100 that the area event has occurred.

As shown in step 80, the discoveree mobile can now set up a direct communication or a group communication with other discoveree mobiles.

While the invention has been described with reference to the exemplary embodiments thereof, those skilled in the art will be able to make various modifications to the described embodiments of the invention without departing from the true spirit and scope of the invention.

The invention claimed is:

1. A method comprising:
    receiving, at a proximity server, a device discovery request from a given wireless device for another wireless device;
    determining, at the proximity server, whether the other wireless device is located within a same geographical area as the given wireless device is within based on the given wireless device and the other wireless device being subscribed to a same proximity based service and based on the other wireless device being serviced by at least one of a same cell and a same access point as the given wireless device, wherein the device discovery request comprises location information for the given wireless device;
    requesting, at the proximity server, location information for the other wireless device from a location server in response to determining that the other wireless device is located within the same geographical area as the given wireless device; and
    determining, at the proximity server, whether the other wireless device is within a predefined proximity of the given wireless device based on the location information for the given wireless device and the location information for the other wireless device.

2. The method of claim 1, further comprising transmitting, at the proximity server, to the given wireless device, a proximity alert message to notify the given wireless device that the other wireless device is currently within the predefined proximity of the given wireless device.

3. The method of claim 1, wherein the other wireless device corresponds to a plurality of wireless devices.

4. The method of claim 1, wherein determining, at the proximity server, whether the other wireless device is located within the same geographical area that the given wireless device is located within is further based on the given wireless device and the other wireless device being in a same zone corresponding to having at least one of a same associated location area identity (LAI), same associated routing area identity (RAI) and same associated tracking area identity (TAI).

5. The method of claim 1, wherein the same cell corresponds to the given wireless device and the other wireless device having a same associated cell global identity (CGI).

6. The method of claim 1, wherein the same access point corresponds to the given wireless device and the other wireless device having a same associated WiFi access point address.

7. The method of claim 1, wherein in response to determining that the other wireless device is not within the predefined proximity of the given wireless device, the proximity server, notifies the given wireless device that the other wireless device is not within the predefined proximity.

8. The method of claim 1, further comprising:
receiving, at the proximity server, an updated device discovery request from the given wireless device for the other wireless device, wherein the given wireless device sends the updated device discovery request when the given wireless device is located within another geographical area.

9. The method of claim 1, wherein determining, at the proximity server, whether the other wireless device is within a predefined proximity of the given wireless device comprises:
calculating, at the proximity server, a distance between the given wireless device and the other wireless device based on the location information for the given wireless device and the location information for the other wireless device; and
determining, at the proximity server, whether the calculated distance is less than or equal to a predefined proximity value.

10. The method of claim 9, further comprising:
transmitting, at the proximity server, to the given wireless device an indication that the other wireless device is within the predefined proximity in response to determining that the calculated distance is less than or equal to the predefined proximity value; and
enabling, the given wireless device to communicate with the other wireless device in response to determining that the calculated distance is less than or equal to the predefined proximity.

11. A system comprising:
a proximity server to:
receive a device discovery request from a given wireless device for another wireless device;
determine whether the other wireless device is located within a same geographical area as the given wireless device is within based on the given wireless device and the other wireless device being subscribed to a same proximity based service and based on the other wireless device being serviced by at least one of a same cell and a same access point as the given wireless device, wherein the device discovery request comprises location information for the given wireless device; and
determine whether the other wireless device is within a predefined proximity of the given wireless device based on location information for the other wireless device and the location information for the given wireless device; and
a location server to:
receive a request for the location information for the other wireless device from the proximity server in response to the proximity server determining that the other wireless device is located within the same geographical area as the given wireless device.

12. The system of claim 11, wherein the other wireless device corresponds to a plurality of wireless devices.

13. The system of claim 11,
wherein determining, at the proximity server, whether the other wireless device is within the predefined proximity of the given wireless device comprises:
calculating a distance between the given wireless device and the other wireless device based on the location information for the given wireless device and the location information for the other wireless device; and
determining whether the calculated distance is less than or equal to a predefined proximity value; and
wherein the proximity server is further to transmit to the given wireless device an indication that the other wireless device is within the predefined proximity in response to determining that the calculated distance is less than or equal to the predefined proximity value.

14. The system of claim 11,
wherein the same cell corresponds to the given wireless device and the other wireless device having a same associated cell global identity (CGI); and
wherein the same access point corresponds to the given wireless device and the other wireless device having a same associated WiFi access point address.

15. A method comprising:
receiving, at a proximity server, a device discovery request from a given wireless device for another wireless device;
determining, at the proximity server, whether the other wireless device is located within a same geographical area as the given wireless device is within based on the given wireless device and the other wireless device being subscribed to a same proximity based service and based on the other wireless device being serviced by at least one of a same cell and a same access point as the given wireless device, wherein the device discovery request comprises location information for the given wireless device;
monitoring for an area event location from the location server in response to determining that the other wireless device is not located within the same geographical area as the given wireless device, wherein the area event notification indicates that the other wireless device has moved into the same geographical area as the given wireless device;
requesting, at the proximity server, location information for the other wireless device from a location server based in response to an indication that an area event has occurred; and
determining, at the proximity server, whether the other wireless device is within a predefined proximity of the given wireless device based on the location information for the given wireless device and the location information for the other wireless device.

16. The method of claim 15, further comprising:
transmitting, at the location server, to the other wireless device, an area event location request to configure the other wireless device for an area event; and
receiving, at the location server, from the other wireless device, an area even report indicating that the area event has occurred corresponding to an indication that the other wireless device has moved into the same geographical area as the given wireless device.

17. The method of claim 16, wherein the other wireless device corresponds to a plurality of wireless devices.

18. The method of claim 15, wherein the proximity server monitors for the area event location from the location server for a period of time, wherein the period of time corresponds to one of a default period of time or a period of time specified within the device discovery request from the given wireless device.

19. The method of claim 18, wherein the proximity server terminates monitoring for the area event location from the location server in response to not receiving from the location server the area event indication within the period of time.

20. The method of claim 15,
wherein the same cell corresponds to the given wireless device and the other wireless device having a same associated cell global identity (CGI); and wherein the same access point corresponds to the given wireless device and the other wireless device having a same associated WiFi access point address.

\* \* \* \* \*